United States Patent [19]

Kuroda et al.

[11] Patent Number: 4,741,773
[45] Date of Patent: May 3, 1988

[54] WATER REPELLENT COMPOSITION

[75] Inventors: Katsuhiko Kuroda; Toru Tagawa; Hiroo Katayama, all of Yokohama, Japan

[73] Assignee: Mitsubishi Chemical Industries Limited, Tokyo, Japan

[21] Appl. No.: 860,569

[22] Filed: May 7, 1986

[51] Int. Cl.$^4$ .................... C09D 5/20; C09K 3/00
[52] U.S. Cl. ........................ 106/2; 106/191; 106/901; 524/67; 524/68
[58] Field of Search ............. 106/901, 2, 191; 524/67, 68

[56] References Cited

U.S. PATENT DOCUMENTS

| | | | |
|---|---|---|---|
| 2,466,642 | 4/1949 | Larsen | 252/28 |
| 3,445,385 | 5/1969 | Vartanian | 252/49.6 |
| 4,059,534 | 11/1977 | Murro | 252/78.3 |
| 4,325,861 | 4/1982 | Braun et al. | 106/191 |
| 4,501,682 | 2/1985 | Goodman et al. | 252/174.15 |
| 4,559,162 | 12/1985 | Abel et al. | 252/314 |
| 4,585,820 | 4/1986 | De Fago et al. | 524/521 |
| 4,655,961 | 4/1987 | Wuhrmann et al. | 524/268 |

FOREIGN PATENT DOCUMENTS

| | | |
|---|---|---|
| 136162 | 10/1980 | Japan . |
| 804241 | 11/1958 | United Kingdom . |
| 1224885 | 3/1971 | United Kingdom . |

OTHER PUBLICATIONS

*Patents Abstracts of Japan*, vol. 8, No. 205 (C-243) [1642], 19 Sep. 1984.
*Patents Abstracts of Japan*, vol. 8, No. 3 (C-203) [1440], 7 Jan. 1984.

*Primary Examiner*—Theodore Morris
*Attorney, Agent, or Firm*—Oblon, Fisher, Spivak, McClelland & Maier

[57] ABSTRACT

A water repellent composition being liquid at room temperature, which comprises a silicone oil and a substantially non-volatile paraffinic oil or low molecular weight resin, wherein the separation index of the paraffinic oil or low molecular weight resin to the silicone oil is at most 0.4.

12 Claims, No Drawings

WATER REPELLENT COMPOSITION

The present invention relates to a water repellent composition, and more particularly to a composition which is capable of imparting water repellency mainly to organic or inorganic fibers, coating compositions or shaped products of inorganic hydraulic materials such as gypsum, gypsum slag, calcium silicate, concrete and autoclaved lightweight concrete.

Compounds such as paraffins, metal salts of fatty acids, asphalts and silicones, have been used as agents for imparting water repellency to such materials.

However, paraffins do not provide adequate water repellency for applications where high temperature treatment is involved. On the other hand, metal salts of fatty acids and asphalts have difficulties that they tend to decrease the strength of the shaped products and the shaped products are likely to be thereby colored. Silicone compounds are satisfactory in such respects, but they have a problem that they are expensive.

The present inventors have conducted extensive researches to obtain an inexpensive water repellent agent while maintaining the desirable features of the silicone compounds, and have surprisingly found that by using a silicone oil in combination with a compound having a certain specific separation index relative to the silicone oil, the above-mentioned problems can be solved without reducing the water repellency even when the amount of the silicone oil is reduced to a level of 70% or less of the conventional silicone oil-type water repellents (silicone oil: 100%). The present invention has been accomplished on the basis of this discovery.

The present invention provides a water repellent composition being liquid at room temperature, which comprises a silicone oil and a substantially non-volatile paraffinic oil or low molecular weight hydrocarbon resin, wherein the separation index of the paraffinic oil or low molecular weight hydrocarbon resin to the silicone oil is at most 0.4.

Now, the present invention will be described in detail with reference to the preferred embodiments.

As the silicone oil constituting the water repellent composition of the present invention, various conventional materials may be employed. However, linear polymers which usually have a viscosit. of from 0.5 to $10^{10}$ centistokes, preferably from $10^2$ to $10^8$ centistokes, at 25° C. and which is liquid at a temperature of from 0° to 40° C., such as polydimethylsiloxane and its modified product, may suitably be employed. As specific examples, there may be mentioned SH-200 (tradename, dimethylpolysiloxane, manufactured by Toray Silicone Co., Ltd.), KF-54 (tradename, methylphenylpolysiloxane manufactured by Shinetsu Chemical Industries Co., Ltd.), KF-99 (tradename, methylhydrodienepolysiloxane, manufactured by Shinetsu Chemical Industries Co., Ltd.), SF-8418 (tradename, methylcarboxypolysiloxane, manufactured by Toray Silicone Co., Ltd.), a modified dimethylpolysiloxane having OH groups at both terminals, and aminomethyl polysiloxane. As the substantially non-volatile paraffinic oil to be used in the present invention, a fraction separated from a petroleum and refined, and composed essentially of paraffinic compounds, a lubricant oil such as a turbine oil or a machine oil containing such a fraction or a liquid paraffin, which is liquid at a temperature of from 0° to 40° C., may be mentioned. As the substantially non-volatile low molecular weight hydrocarbon resin, a polybutene, a polybutadiene, an epoxidized polybutadiene, a low molecular weight polymer of an α-olefin having from 6 to 18 carbon atoms, a petroleum resin, or a coumarone-indene resin, which usually has a molecular weight of up to 5000 and which is liquid at a temperature of from 0° to 40° C., may be mentioned. Here, "substantially non-volatile" means that when the water repellent composition of the present invention is applied to an object, the paraffinic oil or low molecular weight hydrocarbon resin in the composition will remain without evaporation for a long period of time.

In the present invention, the paraffinic oil and low molecular hydrocarbon resin are required to have a separation index of at most 0.4 to the silicone oil. If the separation index of the paraffinic oil and low molecular hydrocarbon resin exceeds 0.4, the water repellency will be inadequate. In such a case, a compatibilizing agent, which improves compatibility of oils to the silicone oil, is added to bring the separation index to a level of at most 0.4. Specific examples of such a compatibilizing agent include a surfactant having a HLB of from 0 to 6 such as a sorbitan dialkylester, a sorbitan trialkylester, an alkylphenol-polyethylene glycol condensation product, a fatty acid-polyethylene glycol condensation product, an aliphatic alcohol-polyethylene glycol condensation product, an aliphatic amide-polyethylene glycol condensation product or a polypropylene glycol-polyethylene glycol condensation product; a perfluoroalcohol-polypropylene glycol-isocyanate condensation product; a monohydric alcohol ester of a fatty acid; a polyhydric alcohol monoester of a fatty acid; a polyhydric alcohol diester of a fatty acid; a copolymer of an α-olefin having from 6 to 52 carbon atoms with a maleic acid monoester or maleic acid diester; or a modified ethylene-vinyl acetate copolymer, which improves the compatibility of the silicone oil with the paraffinic oil or low molecular weight hydrocarbon resin. Among these, the copolymer of an α-olefin having from 6 to 52 carbon atoms with a maleic acid monoester or maleic acid diester is preferred. The control of the separation index of the paraffinic oil and low molecular weight hydrocarbon resin can conveniently be conducted by adding the above-mentioned compatibilizing agent to the mixture comprising a silicone oil and the paraffinic oil and/or low molecular weight hydrocarbon resin. In such a case, the amount of the compatibilizing agent is suitably selected within a range of from 0.1 to 50% by weight relative to the above-mentioned mixture.

In the present invention, the separation index is a value obtained by introducing 25 g of a liquid obtained by mixing the silicone oil and the above-mentioned variable liquid compound in the weight ratio of 3:2 or such a liquid with an addition of a compatibilizing agent in the above-mentioned range, into a 50 ml beaker, and stirring it with a Teflon stirring element (length: 20 mm, diameter: 6–8 mm) by a magnetic stirrer at 1200 rpm for 5 minutes, then transferring the liquid mixture to a test tube having a diameter of about 17 mm, and leaving it to stand still at a temperature of from 15 to 30° C. for 60 minutes, whereupon the height of the transparent layer formed is divided by the total height of the liquid to obtain a value as the separation index.

Accordingly, in the case where a water repellent composition contains a compatibilizing agent, its separation index is obtained by conducting the above-mentioned measurement by using as a test sample a composition obtained by adding to a composition comprising the silicone oil and the paraffinic oil or low molecular weight hydrocarbon resin in the weight ratio of 3:2, a compatibilizing agent in an amount to bring its ratio relative to the paraffinic oil or low molecular weight hydrocarbon resin to the above-mentioned ratio of the compatibilizing agent to the paraffinic oil or molecular weight hydrocarbon resin in the water repellent composition.

In the water repellent composition of the present invention, the mixing ratio of the silicone oil and the paraffinic oil or low molecular weight hydrocarbon resin is preferably within a range of from 70:30 to 10:90 by weight ratio. Particularly preferred is a range of from 60:40 to 20:80. If the silicone oil is less than the above ratio, the water repellency will be inadequate, and if it exceeds the above ratio, the cost of the water repellent composition tends to be expensive, such being undesirable.

In the present invention, the above-mentioned silicone oil and the paraffinic oil or low molecuar weight hydrocarbon resin, if necessary, together with a compatibilizing agent, are dispersed and mixed in accordance with a conventional method by e.g. a turbine vane stirrer or a homomixer, or dissolved in an organic solvent such as toluene or benzene, to obtain a water repellent composition.

Further, the above-mentioned water repellent composition may be used in the form of an emulsion by emulsifying it with an addition of water and, if necessary, together with a surfactant. To obtain an emulsion, the silicone oil, the paraffinic oil or low molecular weight hydrocarbon resin and water may simultanesouly be mixed without preliminarily preparing the above-mentioned water repellent composition. If a compatibilizing agent is employed in such a case, it is advantageous from the viewpont of the formation of an emulsion that the compatibilizing agent is preliminarily incorporated to the silicone oil or to the paraffinic oil or low molecular weight hydrocarbon resin.

As the surfactant to be employed for the preparation of the emulsion, there may be mentioned, in addition to the nonionic surfactants mentioned above, those which are commonly employed as emulsifying agents. The nonionic surfactants to be used for the emulsion may have a HLB of at least 6. However, those having a high emulsifying action are preferred.

Specifically, there may be mentioned nonionic surfactants such as an ethylene glycol condensation product of a sorbitan alkyl ester, a fatty acid-polyethylene glycol condensation product, an aliphatic amide-polyethylene glycol condensation product, an aliphatic amine-polyethylene glycol condensation product, an aliphatic alcohol-polyethylene glycol condensation product, an alkylphenol-polyethylene glycol condensation product, and a polypropylene glycolpolyethylene glycol condensation product; anionic surfactants such as a sodium alkylsulfonate and sodium dialkylsulfosuccinate; and cationic surfactants such as an alkyl amine salt and a polyoxyethylene alkyl amine salt. Further, paraffin oxide, ester wax or a salt thereof may also be employed. These surfactants may be used preferably in the minimum amount required for emulsifying the mixture comprising the silicone oil and the paraffinic oil or low molecular weight hydrocarbon resin to water. Usually, it is added in an amount of from 2 to 30% by weight, preferably from 2 to 20% by weight, relative to the water repellent composition. For the emulsification of the above composition, conventional methods such as a homomixer, a colloid mill, a valve homogenizer and the ultrasonic waves, may be employed.

Further, for the purpose of increasing the viscosity of this emulsion or improving the stability, water-soluble polymer compounds, for example, synthetic polymers such as a polyvinyl alcohol, a polyethylene imine, a polyacrylic acid, a styrene-maleic anhydride copolymer or their salts; cellulose derivatives such as methyl cellulose, carboxymethyl cellulose or hydroxymethyl cellulose, may be added. Such a water-soluble polymer compound is used usually in an amount of from 0.01 to 10% by weight, preferably from 0.01 to 6% by weight. If the amount of the addition is less than 0.01 weight %, no adequate improvement in the stability can be expected. On the other hand, if the amount exceeds 10% by weight, an adverse effect to the water repellency may be brought about, such being undesirable.

Conventional methods may be employed for the application of the water repellent composition of the present invention to organic or inorganic fibers, coating compositions or inorganic hydraulic materials. For instance, there may be mentioned a method for incorporation wherein the water repellent composition is added and dispersed in a slurry of inorganic hydraulic materials, a method wherein the water repellent composition is coated or sprayed on to the surface of fibers or shaped articles, or a method in which fibers or shaped articles are dipped in the water repellent composition. Further, various additives may also be incorporated during the above-mentioned processing or treatment without any particular restriction.

As discussed in detail in the foregoing, the water repellent composition of the present invention comprises a silicone oil and a paraffinic oil or low molecular weight hydrocarbon resin having a certain specific separation index to the silicone oil, whereby the amount of the silicone oil can be substantially reduced as compared with conventional silicone oil-type water repellents, and yet the composition has high water repellency substantially equal to the conventional products and yet is inexpensive as compared with the conventional products. Further, while the conventional silicone oil-type water repellents may not impart adequate water repellency in the case where the substrate is cotton or paper, the water repellent composition of the present invention is capable of imparting water repellency without being restricted to the type of the substrate.

Further, the water repellent composition of the present invention has excellent alkali resistance. For instance, when applied to a substrate like concrete which becomes alkaline in the presence of water, the water repellent composition of the present invention does not undergo a deterioration in the water repellency which used to be the case where a conventional water repellent of silicone alone was used, and it is also possible to maintain the water repellency for a long period of time.

When a conventional water repellent of silicone alone is applied to a substrate coated with an oil-type coating composition, the water repellent tends to be repelled, while the water repellent composition of the present invention has a lipophilic nature, and can be applied to such a substrate without being repelled.

Furthermore, the water repellent composition of the present ivnention has autoclave resistance and is capable of imparting excellent water repellency to a substrate to be subjected to autoclave treatment such as a calcium silicate shaped product or an autoclaved lightweight concrete, while it is capable of imparting excellent water repellency to a substrate even when it is dried at room temperature in contrast with the conventional paraffin-type water repellents.

Now, the present invention will be described in further detail with reference to Examples, Comparative Examples and Test Examples. However, it should be understood that the present invention is by no means restricted by these specific Examples.

In the following description, "parts" and "%" mean "parts by weight" and "% by weight", respectively. Further, the silicone oil used in the Examples and Comparative Examples, was SH-200 (manufactured by Toray Silicone Co., Ltd., viscosity: 500 cst./25° C.).

EXAMPLE 1

To a mixture comprising 60 parts of a turbine oil having a separation index of 0.44 (Diamond Turbine Oil #68, manufactured by Mitsubishi Petroleum Co., Ltd.) and 40 parts of the silicone oil, 2 parts of sorbitan dioleate having a HLB of 2.1 was added, and the mixture was thoroughly mixed and dispersed by a homomixer to obtain an oily composition (a).

The separation index of the turbine oil was adjusted to 0.31 by the addition of the sorbitan dioleate.

COMPARATIVE EXAMPLE 1

In Example 1, the turbine oil and the silicone oil, without an addition of the sorbitan dioleate, were mixed and dispersed by the homomixer to obtain an oily composition (b). The separation index of the turbine oil was 0.44.

EXAMPLE 2

102 parts of the composition (a) obtained in Example 1 and 100 parts of deionized water were emulsified by a homomixer to obtain an emulsion (c) having a solid content of 50.3%.

EXAMPLE 3 231 parts (1 mol) of α-olefins having from 16 to 18 carbon atoms (Dialen 168, manufactured by Mitsubishi Chemical Industries Limited) and 189 parts (1.1 mol) of diethyl maleate were charged into a 1 liter four necked flask, and heated to 160° C. under a nitrogen atmosphere. Then, to this mixture, 9.66 parts (0.066 mol) of di-tert-butylperoxide was added in portions of ⅓ in an interval of 20 minutes under stirring.

After the addition, the reaction was conducted for further 1 hour at the same temperature.

After the completion of the reaction, light boiling components and unreacted monomers contained in the reaction mixture were distilled off under a reduced pressure of from 1 to 3 mmHg to obtain an α-olefin ($C_{16}$-$C_{18}$)-diethyl maleate copolymer (hereinafter referred to as PAR 168 Et).

4 parts of PAR 168 Et thus obtained and 40 parts of a turbine oil (Diamond Turbine Oil #68) and 60 parts of the silicone oil were mixed and dispersed by a homomixer to obtain an oily composition.

The separation index of the turbine oil was adjusted to 0.11 by the addition of PAR 168 Et. To this mixture, 2 parts of a propylene oxide-ethylene oxide copolymer (HLB: 11.6) as an emulsifier and 109 parts of deionized water were added, and the mixture was emulsified by a homomixer to obtain an emulsion (d) having a solid content of 49.3%.

EXAMPLE 4

40 parts of a polybutene having a separation index of 0.00 and 60 parts of the silicone oil were mixed and dispersed by a homomixer to obtain an oily composition. To this composition, 2 parts of an emulsifier (Pluronic L-64, tradename, an ethylene oxide-propylene oxide copolymer, HLB: 10.1, manufactured by Asahi Denka Kogyo K.K.) and 100 parts of deionized water were added, and emulsified by a homomixer to obtain an emulsion (e) having a solid content of 50.2%.

EXAMPLE 5

To a mixture of 51 parts of a coumarone-indene resin having a separation index of 0.40 and 34 parts of silicone oil, 0.5 part of a polyalkylene glycolisocyanate condensation product containing perfluoroalkyl groups (Megafac F 184, tradename, manfuactured by Dainippon Ink & Chemicals Inc.) was added to obtain a mixture (so that the separation index was adjusted to 0.10). To this mixture, 16 parts of a dimethylethanolamine salt of oxidized paraffin (mp: 70° C., acid value: 43) and 2 parts of an aliphatic amide-ethylene oxide adduct (Esomide HT 60, tradename, Lion Aczo Co., Ltd.) were dissolved at 80° C., and then 200 parts of deionized water of 80° C. was added, and the mixture was emulsified by a homomixer to obtain an emulsion (f) having a solid content of 30.2%.

COMPARATIVE EXAMPLE 2

40 parts of a turbine oil having a separation index of 0.44 (Diamond Turbine Oil #68) and 60 parts of the silicone oil were mixed and dispersed by a homomixer, and then 2 parts of an emulsifier (Pluronic L 44, tradename, an ethylene oxide-propylene oxide copolymer, manufactured by Asahi Denka Kogyo K.K.) and 100 parts of deionized water were added to obtain an emulsion (g) having a solid content of 50.4%.

COMPARATIVE EXAMPLE 3

100 parts of the silicone oil, 2 parts of a propylene oxide-ethylene oxide copolymer (HLB: 6.3) as an emulsifier, and 100 parts of deionized water were emulsified by a homomixer to obtain an emulsion (h) having a solid content of 50.2%.

TEST EXAMPLES 1 to 5

A glass mat ($\rho$=0.025) was dipped in a liquid obtained by diluting the emulsion (d), (e), (g) or (h) with water to bring the solid content to 1%. After water drainage for 1 hour, the mat was dried at 150° C. for 2 hours. To this, water was sprayed in accordance with JIS L 1092 spray test, whereby the water absorption was measured. The results are shown in Table 1. For the purpose of comparison, the results obtained in a system where no water repellent was added, are also shown.

From Table 1, it is evident that the water repellent compositions having a separation index of less than 0.4 show water repellency substantially equal to the silicone oil.

TEST EXAMPLE 6 to 10

6.7 g of cotton broadcloth was dipped in a bath containing 5% as the solid content of the emulsion (d), (e), (g) or (h), and treated by 1 dip, 1 nip with a squeezing rate of 76%. Then, the cloth was pre-dried at 80° C. for 3 minutes, and then cured at 130° C. for 5 minutes by using a pin tenter. Further, the cloth was heated in a dryer of 150° C. for 2 hours. The water repellency of this cloth was measured in accordance with JIS L-1004, and the water absorption after the evaluation of the water repellency was measured. The results are shown in Table 2. For the purpose of comparison, the results in the case where no water repellent was added, are also given.

TEST EXAMPLE 11 to 13

A non-sized paper having a weight of 123 g/m² was dipped for 1 minute in a bath containing 1% as a solid content of the emulsion (d), (g) or (h), and squeezed by rollers, and after measuring the pick-up amount, pressed at 120° C. for from 2 to 3 minutes, and further heated in a dryer of 170° C. for 2 hours. Then, it was pretreated in accordance with JIS P-8111, and then the water resistance (stockigt sizing degree) was measured in accordance with JIS P-8122. The results are showh in Table 3.

TEST EXAMPLES 14 to 16

To a commercially available vinyl acetate-type emulsion coating composition (manufactured by Kansai Paint Co., Ltd., solid content 57%), the emulsion (d), (g) or (h) was added in an amount of 5% as a nonvolatile component. The coating composition was coated on the surface of a gypsum board in an amount of about 300 g/m². The coated board was dried at 60° C. for 1 hour. Then, 1 ml of deionized water was dropped thereon, and a watch glass was placed thereon, whereupon the time until the water drop disappeared completely was measured to determine the water resistance. The results are shown in Table 4.

TEST EXAMPLES 17 to 24

To a slurry comprising 160 parts of Porland cement, 143 parts of silica powder, 0.2 part of metal aluminum and 200 parts of water, the water repellent composition as identified in Table 5 was mixed to bring the nonvolatile content to 2 parts, and the mixture was poured into a mold frame. The mixture was foamed and cured. The molded product was taken out from the mold frame and cured with steam in an autoclave at 180° C. under 10 kg/cm²G for 5.5 hours, and dried at 105° C. for further 10 hours to obtain an autoclaved lightweight concrete. The concrete was placed in water of 20° C. at a position 30 mm below the water surface, and left to stand for 24 hours, whereupon the water absorbance was determined based on the weight change. The results are shown in Table 5.

TEST EXAMPLES 25 to 28

The emulsion (c), (g) or (h) was coated on the surface of a commercially available concrete block in an amount of 100 g/m², and dried for 3 days at room temperature. After drying, 1 ml of water was droped, and a watch dish was put thereover to prevent the evaporation, whereby the time until the water drop disappeared completely was measured to determine the water resistance. With respect to the case where no water repellent was applied, the water resistance was measured in the same manner, and the results are also shown in Table 6.

TABLE 1

| Test Example | Water repellent composition | Separation index | Amount added (%) | Water Absorbance (%) |
| --- | --- | --- | --- | --- |
| 1 | d (60%) | 0.11 | 2.2 | 22.2 |
| 2 | e (60%) | 0.00 | 2.4 | 24.7 |
| 3 | g (60%) | 0.44 | 2.2 | 40.0 |
| 4 | h (100%) | — | 2.1 | 21.2 |
| 5 | Nil | — | — | 49.5 |

Note 1. The (%) in the column for the water repellent composition indicates the silicon content in the active ingredient.
Note 2. The amount added means 100 times the value obtained by dividing the weight of the non-volatile content in the water repellent composition remaining on the substrate by the weight of the substrate.
The same applies to the following Tables.

TABLE 2

| Test Example | Water repellent composition | Separation index | Amount added (%) | Water repellency | Water absorbance (%) |
| --- | --- | --- | --- | --- | --- |
| 6 | d (60%) | 0.11 | 3.8 | 70 | 20.2 |
| 7 | e (60%) | 0.00 | 3.8 | 70 | 23.3 |
| 8 | g (60%) | 0.44 | 3.8 | 50 | 31.3 |
| 9 | h (100%) | — | 3.8 | 50 | 49.0 |
| 10 | Nil | — | — | 0 | 69.4 |

TABLE 3

| Test Example | Water repellent composition | Separation index | Amount added (%) | Water repellency (Stockigt/sec.) |
| --- | --- | --- | --- | --- |
| 11 | d (60%) | 0.11 | 16.0 | 161 |
| 12 | g (60%) | 0.44 | 17.4 | 8 |
| 13 | h (100%) | — | 15.2 | 0 |

TABLE 4

| Test Example | Water repellent composition | Separation index | Amount added (%) | Water resistance (min) |
| --- | --- | --- | --- | --- |
| 14 | d (60%) | 0.11 | 5.0 | 40 |
| 15 | g (60%) | 0.44 | 5.0 | 11 |
| 16 | h (100%) | — | 5.0 | 17 |

TABLE 5

| Test Example | Water repellent composition | Separation index | Amount added (%) | Water absorbance (%) |
| --- | --- | --- | --- | --- |
| 17 | a (40%) | 0.31 | 2.0 | 26.1 |
| 18 | c (40%) | 0.31 | 2.0 | 17.0 |
| 19 | d (60%) | 0.11 | 2.0 | 17.2 |
| 20 | e (60%) | 0.00 | 2.0 | 18.0 |
| 21 | f (34%) | 0.10 | 2.0 | 19.2 |
| 22 | b (40%) | 0.44 | 2.0 | 38.2 |
| 23 | g (60%) | 0.44 | 2.0 | 54.3 |
| 24 | h (100%) | — | 2.0 | 18.5 |

TABLE 6

| Test Example | Water repellent composition | Separation index | Water resistance (min) |
| --- | --- | --- | --- |
| 25 | c (40%) | 0.31 | 1440 or more |
| 26 | g (60%) | 0.44 | 32 |
| 27 | h (100%) | — | 30 |
| 28 | Nil | — | 0 |

We claim:
1. A water-repellent composition which is liquid at room temperature, which consists essentially of:
(a) a silicone oil;

(b) a substantially non-volatile paraffinic oil or resin having a molecular weight of up to 5,000; and (c) a compatibilizing agent, which is capable of reducing the separation index of the substantially non-volatile volatile paraffinic oil or hydrocarbon resin to the silicon oil to 0.4 at most, said compatibilizing agent being selected from the group consisting of a surfactant having a HLB of from 0 to 6, a perfluoroalcohol-polypropylene glycol-isocyanate condensation product, an ester of a fatty acid with a monohydric or polyhydric alcohol, a copolymer of an α-olefin having from 6–52 carbon atoms with a maleic acid monoester or maleic acid diester, and an ethylene-vinyl acetate copolymer.

2. The water-repellent composition according to claim 1, wherein said silicone oil is a linear polymer having a viscosity of from 0.5 to $10^{10}$ centistokes at 25° C. and which is liquid at a temperature from 0° to 40° C.

3. The water-repellent composition according to claim 2, wherein said silicone oil is a polydimethylsiloxane.

4. The water-repellent composition according to claim 3, wherein said polydimethylsiloxane is selected from the group consisting of dimethylpolysiloxane, methylphenylpolysiloxane, methylhydrodienepolysiloxane, methylcarboxypolysiloane, a modified dimethylpolysiloxane having OH groups at both terminials, and aminomethyl polysiloxane.

5. The water-repellent composition according to claim 6, wherein the weight ratio of the silicone oil and the paraffinic oil resin is within a range of 60.40 to 20:80.

6. The water repellent composition according to claim 1, wherein the weight ratio of the silicone oil and the paraffinic oil or resin is within a range of from 70:30 to 10:90.

7. The water-repellent composition according to claim 1, wherein said surfactant is a non-ionic surfactant selected from the group consisting of an ethylene glycol condensation product of a sorbitan alkyl ester, a fatty acid-polyethylene glycol condensation product, an aliphatic amidepolyethylene glycol condensation product, an aliphatic amine-polyethylene glycol condensation product, an aliphatic alcohol-polyethylene glycol condensation product, an alkylphenol-polyethylene glycol condensation product and a polypropylene glycol-polyethylene glycol condensation product; an anionic surfactant selected from the group consisting of sodium alkylsulfonate and sodium dialkylsulfosuccianate; and a cationic surfactant selected from the group consisting of an alkyl amine salt and a polyoxyethylene alkyl amine salt, in an amount of about 2 to 20% by weight.

8. The water-repellent composition according to claim 1, which further comprises a synthetic polymer selected from the group consisting of a polyvinyl alcohol, a polyethylene imine, a polyacrylic acid, a styrene-maleic anhydride copolymer or a salt-thereof, methylcellulose, carboxymethylcellulose and hydroxymethylcellulose in an amount of about 0.01 to 10% by weight, in order to increase the viscosity.

9. The water repellent composition according to claim 1, wherein the water repellent composition is an aqueous emulsion.

10. The water repellent composition according to claim 1, wherein the substantially non-volatile paraffinic oil is a fraction separated from a petroleum and refined and composed essentially of paraffinic compounds, a lubricant oil such as a turbine oil or a machine oil containing such a fraction, or a liquid paraffin, which is liquid at a temperature of from 0° to 40° C.

11. The water repellent composition according to claim 1, wherein the substantially non-volatile resin is a polybutene, a polybutadiene, an epoxidized polybutadiene, a polymer of an α-olefin having from 16 to 18 carbon atoms, a petroleum resin or a coumarone-indene resin, which is a liquid at a temperature of from 0° to 40° C.

12. The water repellent composition according to claim 1, wherein the compatibilizing agent is in an amount of from 0.1 to 50% by weight relative to the total amount of the silicone oil and the paraffinic oil or resin.

* * * * *